United States Patent [19]

Buchholz et al.

[11] Patent Number: 5,278,353

[45] Date of Patent: Jan. 11, 1994

[54] AUTOMATIC SPLICE

[75] Inventors: Vernon L. Buchholz, Burnaby; Christopher P. Morton, Surrey, both of Canada

[73] Assignee: Powertech Labs Inc., Surrey, Canada

[21] Appl. No.: 893,936

[22] Filed: Jun. 5, 1992

[51] Int. Cl.[5] .................. H02G 15/08; N01R 43/00
[52] U.S. Cl. .................. 174/84 R; 174/84 S; 174/90; 174/94 S; 403/314; 403/369; 439/816; 439/820
[58] Field of Search .................. 174/84; 403/366, 369, 403/371, 314, 327; 24/115; 439/816, 820

[56] References Cited

U.S. PATENT DOCUMENTS

| 1,854,783 | 4/1932 | Cook | 174/84 S X |
|---|---|---|---|
| 2,041,108 | 5/1936 | Becker, Sr. et al. | 439/820 |
| 2,128,832 | 8/1938 | Lusher | 403/369 X |
| 2,138,913 | 12/1938 | Fotsch | 403/369 X |
| 2,554,387 | 5/1951 | Saul | 403/327 |
| 3,098,275 | 7/1963 | Schweitzer . | |
| 3,205,300 | 9/1965 | Becker | 174/84 S |
| 3,241,204 | 3/1966 | Baricevic et al. | 403/113 |
| 3,374,511 | 3/1968 | Barker | 403/369 |
| 3,681,512 | 8/1972 | Werner et al. | 174/84 S |
| 3,852,850 | 12/1974 | Filhaber | 24/136 R |
| 3,912,406 | 10/1975 | McGrath | 403/369 X |
| 3,937,607 | 2/1976 | Rodormer | 425/111 |
| 4,362,352 | 12/1982 | Hawkins et al. | 174/94 R |

FOREIGN PATENT DOCUMENTS 402967 3/1943 Italy .................. 174/94 S

Primary Examiner—Morris H. Nimmo
Attorney, Agent, or Firm—Barrigar & Oyen

[57] ABSTRACT

An improved cable splice of the type in which first and second ends of a casing taper conically toward the casing's longitudinal axis. First and second cable-receiving apertures are provided in the respective first and second ends of the casing. A first set of cable-gripping jaws is disposed within the first end of the casing; and, a second set of cable-gripping jaws is disposed within the second end of the casing. At least one spring is provided within the casing, between the jaws, to urge the first and second jaws toward the first and second apertures respectively. A first plug is positioned within the inner end of the first set of jaws to bias the first set of jaws against the spring by forcing the jaws radially outwardly. A second plug is positioned within the inner end of the second set of jaws to bias the second set of jaws against the spring by forcing the jaws radially outwardly. The plugs are free of connection to the jaws. This allows the plugs to be displaced from the jaws by passage of a member such as a cable through one of the apertures to contact the plug. Displacement of the plugs from the jaws relieves the aforesaid biasing and permits the spring to urge the jaws along the axis toward the apertures as aforesaid.

6 Claims, 5 Drawing Sheets

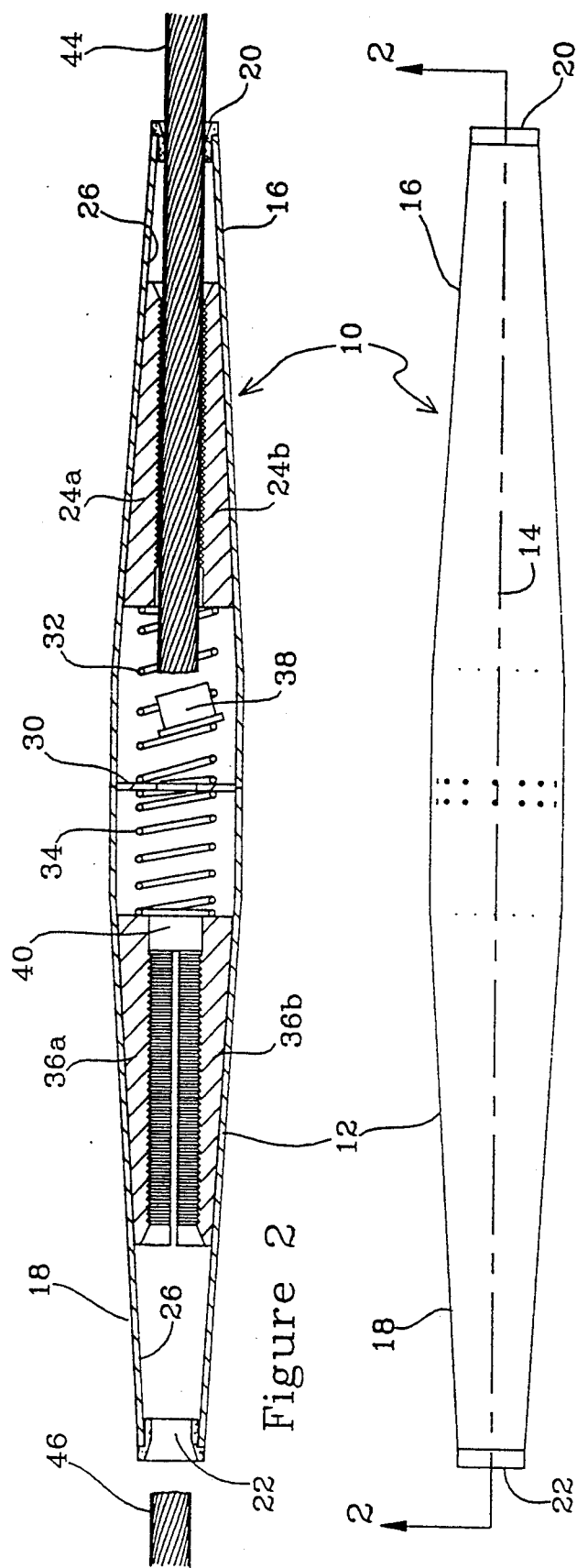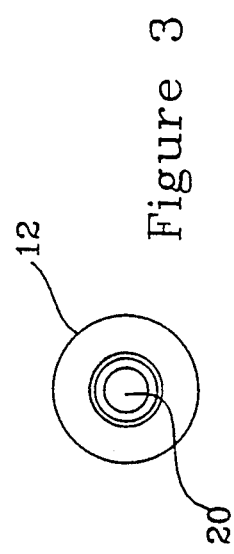

AUTOMATIC SPLICE

FIELD OF THE INVENTION

This application pertains to a cable-splicing device having an opposed pair of tapered, cable-gripping jaws. An improved mechanism is provided to hold the jaws open and permit advancement or retraction of a cable through the jaws until they are clamped on to the cable.

BACKGROUND OF THE INVENTION

"Automatic splices" are used to longitudinally splice two lengths of cable together. Such devices are typically used by power utility linemen to splice lengths of high voltage cable together.

U.S. Pat. No. 3,205,300 issued 7 September, 1965 to Becker for a "Cable Gripping Unit" is typical of the prior art. The opposed ends of Becker's device each contain a set of tapered jaws. The lineman inserts the cable ends through apertures provided in each of the opposed ends of the device. After inserting suitable lengths of each cable into the device, the lineman draws the cables longitudinally away from the device. This action pulls the jaws into the tapered ends of the device's casing, thereby securely clamping the jaws on to the cable.

During cable insertion into prior art splicing devices, the lineman must feed the cable through the jaws. But, the jaws are pressed into the tapered casing by the action of a spring, and are not held open to allow unimpeded insertion of the cable. The inside of the jaws have serrated teeth which tend to resist cable insertion. To aid cable insertion, prior art devices provide a cup on the inside of each aperture. The cup covers the cut end of the cable as it is advanced through the jaws, to help prevent the serrated jaw teeth from catching on the cable end.

In practice, lineman have had some difficulty installing prior art splicing devices because the cable end, despite the aforesaid cup, sometimes gets caught in the jaws. Since there is no positive indication that the cable end has been fully inserted through the jaws, the lineman may leave the cable inserted only partly through the jaws. This is undesirable, because the mechanical contact between the jaws and the cable may be insufficient for long term retention of the cable and because the electrical conduction characteristics of the device may be impaired if only part of the jaws contact the cable. Although the lineman is typically instructed to mark the cable to indicate its full insertion length, in fact this is seldom done. There have been many cases in which improperly installed splices have allowed high voltage cables to fall to the ground.

The present invention overcomes the foregoing problems by providing a spring-loaded mechanism which initially holds the jaws well away from the cable, allowing free advancement or retraction of the cable relative to the jaws until the device is activated to clamp the jaws on to the cable. The invention does not require cups to cover the cable ends since the jaws are held well away from the cable. The invention also provides a positive indication that the cable end has been fully inserted through the jaws. The lineman need not mark the cable to indicate full insertion length.

An additional problem with prior art splicing devices is that they can only be used for splicing cables which are under high mechanical tension. This is because the higher the cable tension, the further the tapered jaws are pulled into the tapered casing and the tighter the cable is gripped. High cable tension also provides a large force to press the jaws against the casing and thus give good electrical contact. When prior art splices are used on short cable spans with very light mechanical loads, electrical connection is poor and overheating may result. In the present invention the spring can be made sufficiently powerful to press the jaws firmly into the tapered casing. It is therefore not necessary to rely solely on cable mechanical tension to provide a high applied force between the jaws and casing. A powerful spring cannot be used in prior art splices since it would aggravate the problem of feeding the cable through the jaws during installation. In the present invention, the jaws are held open during cable insertion and the spring may therefore be sufficiently strong to allow the device to be used with low cable tension.

SUMMARY OF THE INVENTION

In accordance with the preferred embodiment, the invention provides an improved cable splice of the type in which opposite ends of a casing taper conically toward the casing's longitudinal axis. Cable-receiving apertures are provided in the opposed ends of the casing. A set of cable-gripping jaws is disposed within each end of the casing. At least one spring is provided within the casing, between the jaws, to urge the jaws toward the respective ends of the casing. Plugs are positioned within the inner ends of the jaws to bias the jaws against the spring by forcing the jaws radially outwardly.

The plugs are free of connection to the jaws. This allows a plug to be displaced from the jaws by passage of a cable through one of the apertures to contact the plug. Displacement of the plugs from the jaws relieves the aforesaid biasing and permits the spring to urge the jaws along the axis toward the ends of the casing as aforesaid.

The plugs may be replaced by "U"-shaped pins having legs which are slidably received within holes drilled in the ends of the jaws.

The force exerted by the springs may be increased to enable the device to function with low tension cables, in which case auxiliary springs may be provided to assist in displacement of the plugs or pins upon contact by the cable.

BRIEF DESCRIPTION OF THE DRAWINGS

FIG. 1 is a side elevation view of an improved automatic splice according to the invention.

FIG. 2 is a cross-sectional view taken with respect to line 2—2 of FIG. 1; and showing a first cable inserted through the right half of the device, with a second cable ready for insertion into the left half of the device.

FIG. 3 is a right hand end view of the device of FIG. 1.

DETAILED DESCRIPTION OF THE PREFERRED EMBODIMENT

Figure 4:
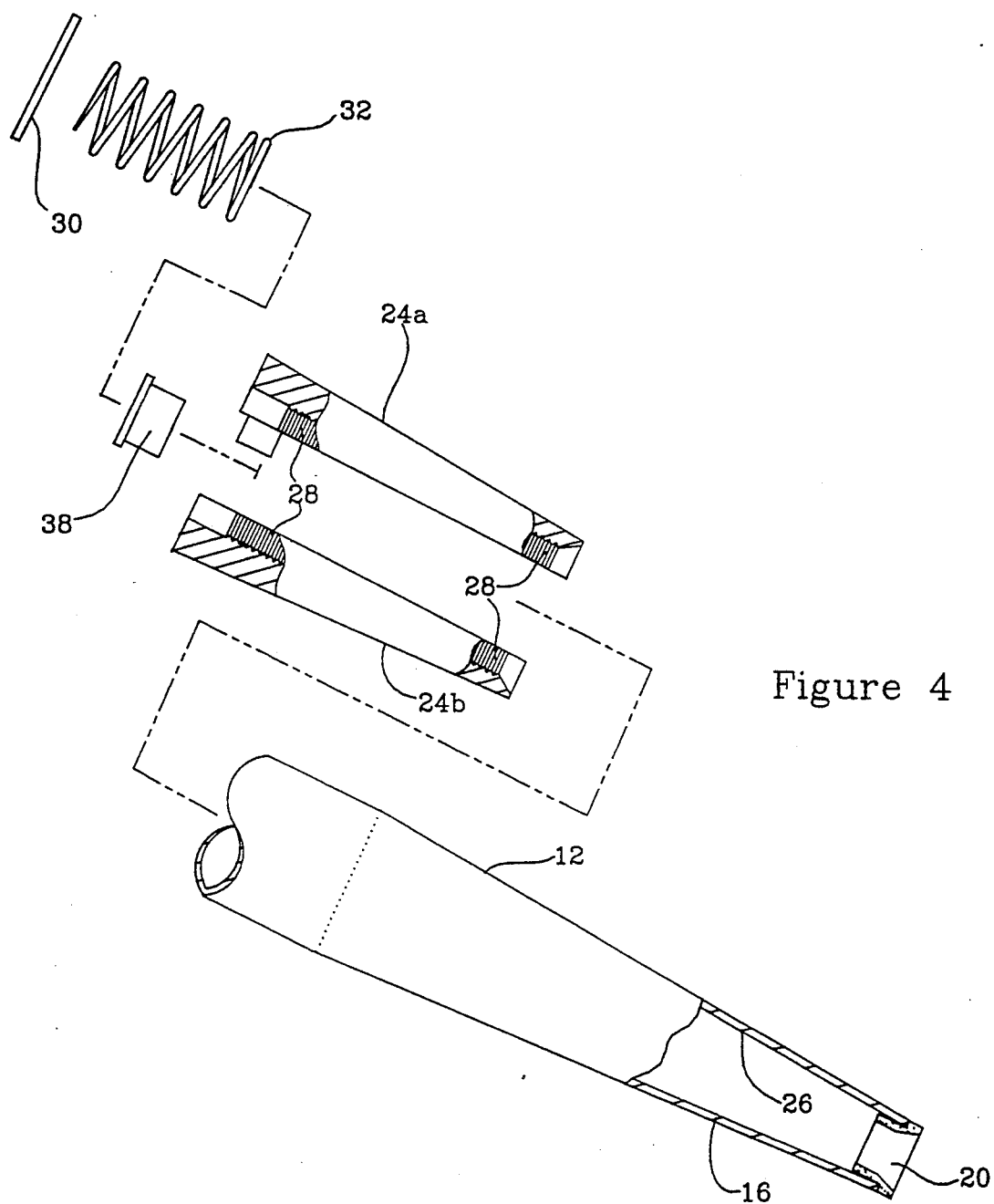
FIG. 4 is an exploded, partially fragmented illustration of the right half of the device of FIGS. 1 and 2, without the cable.

The drawings illustrate a cable-splicing device 10 having an outer metallic casing 12 which is symmetrical about its longitudinal axis 14. Device 10 has first and second ends 16, 18 which respectively taper conically toward axis 14. First and second cable-receiving apertures 20, 22 are provided in casing ends 16, 18 respectively.

A first set of mating, cable-gripping jaws 24a, 24b is disposed within casing first end 16. As best seen in FIG. 4, jaws 24a, 24b together form a cable enclosure having a conically tapered outer surface which conforms to the shape of conically tapered inner surface 26 of casing 12. Jaws 24a, 24b each have semi-cylindrical inner surfaces bearing serrated teeth 28.

A divider plate 30 is fixed in the centre of casing 12, perpendicular to axis 14. First spring 32 is compressed between the right side of divider plate 30 and the inner ends of jaws 24a, 24b. Device 10 is symmetrical about divider plate 30. That is, casing 12's second end 18 contains a second spring 34 which is compressed between the left side of divider plate 30 and the inner ends of a second set of mating, cable-gripping jaws 36a, 36b.

First and second plugs 38, 40 are initially installed within the innermost ends of jaws 24a, 24b and 36a, 36b respectively. First plug 38 forces jaws 24a, 24b radially outwardly, away from axis 14. Second plug 40 similarly forces jaws 36a, 36b radially outwardly, away from axis 14. The jaws are thus held open by plugs 38, 40. This allows unimpeded advancement or retraction of a cable through the jaws.

Figure 5A:
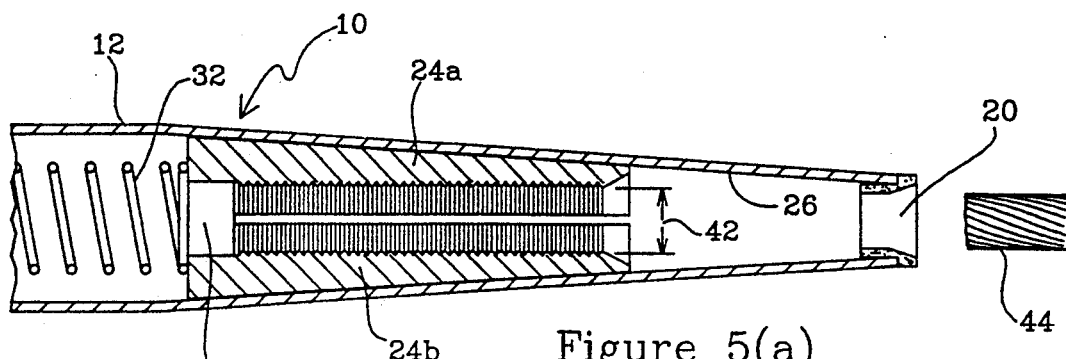
FIGS. 5(a) through 5(d) are sectional views of the right half of the device, showing the sequence of steps in which a cable is inserted into the device and clamped thereby.

FIG. 5(a) depicts the right half of device 10 with plug 38 in its initially installed position, holding jaws 24a, 24b radially outwardly away from axis 14. Spring 32 is compressed against the inner ends of jaws 24a, 24b, thus forcing jaws 24a, 24b toward aperture 20. But, the distance jaws 24a, 24b may advance toward aperture 20 is restricted by contact between the outwardly thrust conically tapered outer surfaces of jaws 24a, 24b and inner surface 26 of casing 12. Device 10 remains in the equilibrium position depicted in FIG. 5(a) with jaws 24a, 24b held open to define a cylindrical passageway 42 between their teeth 28.

Figure 5B:
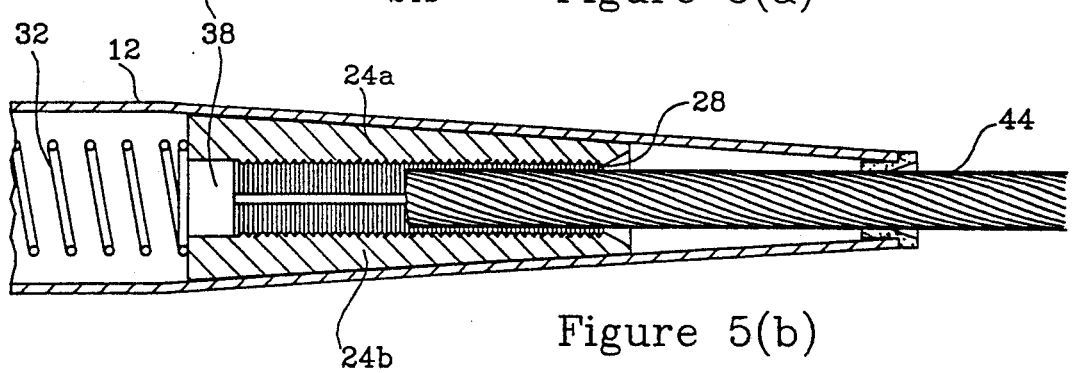

The end of a cable 44 is then passed through cable-receiving aperture 20 and into cylindrical passageway 42 as depicted in FIG. 5(b). Plug 38 holds jaws 24a, 24b open to a sufficient extent to keep teeth 28 clear of cable 44. This allows free advancement or retraction of cable 44 through passageway 42, without permitting teeth 28 to catch upon cable 44 or otherwise impede the movement of cable 44 through passageway 42. Preferably, the internal diameter of passageway 42 should be greater than 1.2 times the external diameter of cable 44 for free advancement and retraction of cable 44 through passageway 42.

Figure 5C:
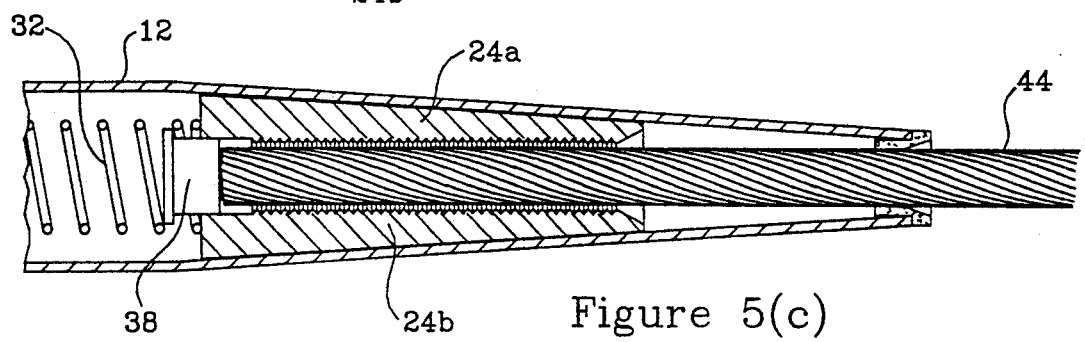
Figure 5D:
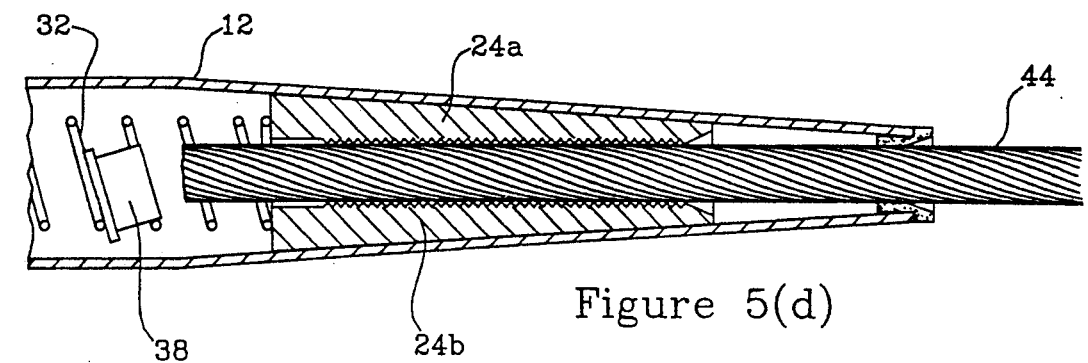

As depicted in FIG. 5(c), cable 44 has been advanced completely through passageway 42, past teeth 28, to contact plug 38. The lineman is able to "feel" the cable end contact the plug, thus providing the lineman with a positive indication that the cable end has passed completely through the jaws. Continued advance of cable 44 through passageway 42 begins to dislodge plug 38 from its initial position within the innermost ends of jaws 24a, 24b as shown in FIG. 5(c), until plug 38 is completely dislodged from jaws 24a, 24b as shown in FIG. 5(d).

While plug 38 is in its initial position aforesaid it biases jaws 24a, 24b into the open position and restricts the extent to which spring 32 may force jaws 24a, 24b toward aperture 20. As soon as plug 38 is completely dislodged from jaws 24a, 24b the jaws are able to slide inwardly toward axis 14, along to casing 12's inner surface 26. Spring 32 is thus able to force jaws 24a, 24b a further distance toward aperture 20. The wedging action between the tapered outer surfaces of jaws 24a, 24b and inner surface 26 forces jaws 24a, 24b radially inwardly toward cable 44 as they are forced along axis 14 toward aperture 20, causing teeth 28 to bite into the outer surface of cable 44. The lineman then "sets" the jaws more firmly by tugging cable 44 sharply away from device 10. This draws jaws 24a, 24b further toward aperture 20, which in turn forces jaws 24a, 24b more firmly radially inwardly onto cable 44, causing teeth 28 to bite more deeply into the outer surface of cable 44.

The second cable 46 (FIG. 2) is inserted into the left hand end of device 10 in a manner identical in all respects to that described above in relation to the right hand end of device 10.

Figure 6:
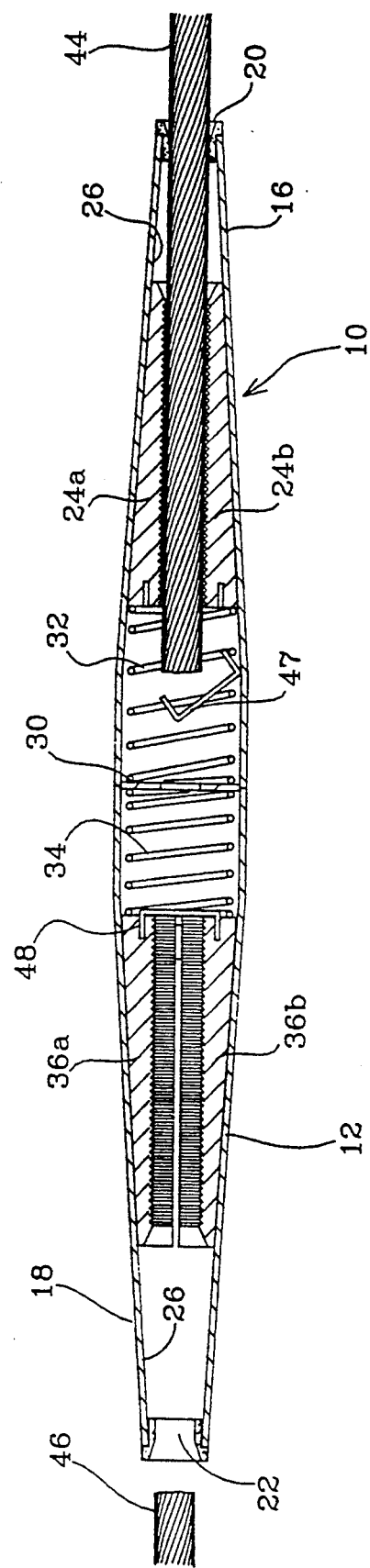
FIG. 6 is similar to FIG. 2, but depicts an alternate embodiment of the invention in which compound pins replace the plugs of FIG. 2.

An alternate embodiment of the invention is shown in FIG. 6. In FIG. 6, plugs 38, 40 of FIG. 2 are replaced by compound pins 47, 48. Holes are drilled into the inner ends of jaws 24a, 24b and 36a, 36b to receive the legs of U-shaped pins 47, 48 respectively. The pin legs are initially slidably fitted into the holes in the jaws to hold the jaws open (i.e. as pin 48 is depicted holding jaws 36a, 36b open). When the cable is advanced completely through the jaws it contacts the head of the pin and slidably dislodges the pin from the holes in the jaws, allowing the spring to snap the jaws onto the cable (i.e. as pin 47 is depicted dislodged from jaws 24a, 24b).

Figure 7:
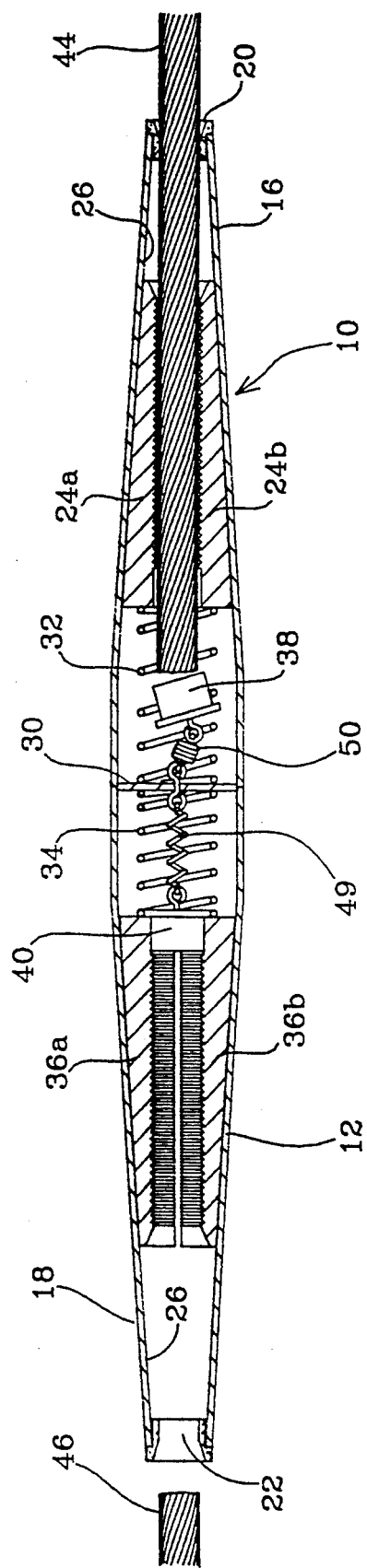
FIG. 7 is similar to FIG. 2, but depicts another alternate embodiment of the invention in which auxiliary springs assist the removal of the plugs.

A further alternate embodiment is shown in FIG. 7. In FIG. 7, auxiliary springs 49, 50 aid in the dislodgement of plugs 38, 40 from jaws 24a, 24b and 36a, 36b respectively. This enhancement is necessary if main springs 32, 34 are made strong enough to force the jaws into the tapered ends of casing 12 to provide good mechanical and electrical contact, despite low cable tension. Because of the high main spring force, plugs 38, 40 may be difficult to dislodge from their initial position in the jaws due to high friction forces. Auxiliary springs 49, 50 are initially coupled in tension between divider plate 30 and plugs 38, 40 respectively. When the cable contacts the plug the energy stored in the auxiliary spring assists in overcoming the friction forces between the plug and the jaws, allowing the plug to be more easily dislodged from the jaws.

As will be apparent to those skilled in the art, in the light of the foregoing disclosure, many alterations and modifications are possible in the practice of this invention without departing from the spirit or scope thereof. For example, although it will normally be advantageous to provide two separate springs 32, 34 on opposite sides of divider plate 30, it would be possible to eliminate divider plate 30 and provide a single spring in compression between the opposed inner ends of jaws 24a, 24b and 36a, 36b. Accordingly, the scope of the invention is to be construed in accordance with the substance defined by the following claims.

What is claimed is:

1. A cable splice, comprising:

(a) a casing having a longitudinal axis along which first and second ends of said casing taper conically toward said axis;
(b) a first aperture in said first casing end;
(c) a second aperture in said second casing end;
(d) a first set of cable gripping jaws disposed within said first casing end, said first set of jaws having an inner end and an outer end;
(e) a second set of cable gripping jaws disposed within said second casing end, said second set of jaws having an inner end and an outer end;
(f) at least one spring provided within said casing, between said inner end of both said first and second set of cable gripping jaws to urge said first set of jaws along said axis toward said first aperture, and to urge said second set of jaws along said axis toward said second aperture;
(g) a first plug positioned within said inner end of said first set of jaws to bias said first set of jaws sufficiently far apart to temporarily prevent said spring from advancing said first set of jaws toward said first aperture; and,
(h) a second plug positioned within said inner end of said second set of jaws to bias said second set of jaws sufficiently far apart to temporarily prevent said spring from advancing said second set of jaws toward said second aperture.

2. A cable splice as defined in claim 1, wherein:
(a) said first plug is capable of separation from said first set of jaws, thus enabling displacement of said first plug from said first set of jaws by passage of a member through said first aperture to contact said first plug, thereby relieving said biasing and permitting said spring to urge said first set of jaws along said axis toward said first aperture; and,
(b) said second plug is capable of separation from said second set of jaws, thus enabling displacement of said second plug from said second set of jaws by passage of a member through said second aperture to contact said second plug, thereby relieving said biasing and permitting said spring to urge said second set of jaws along said axis toward said second aperture.

3. A cable splice as defined in claim 2, further comprising:
(a) a second spring coupled in tension between said casing and said first plug; and,
(b) a third spring coupled in tension between said casing and said second plug.

4. A cable splice, comprising:

(a) a casing having a longitudinal axis along which first and second ends of said casing taper conically toward said axis;
(b) a first aperture in said first casing end;
(c) a second aperture in said second casing end;
(d) a first set of cable gripping jaws disposed within said first casing end, said first set of jaw having an inner end and an outer end;
(e) a second set of cable gripping jaws disposed within said second casing end, said second set of jaws having an inner end and an outer end;
(f) at least one spring provided within said casing, between said inner end of both said first and second set of cable gripping jaws to urge said first set of jaws along said axis toward said first aperture, and to urge said second set of jaws along said axis toward said second aperture;
(g) a first U-shaped pin having first and second legs slidably receivable within said inner end of said first set of jaws to bias said first set of jaws sufficiently far apart to temporarily prevent said spring from advancing said first set of jaws toward said first aperture; and,
(h) a second U-shaped pin having first and second legs slidably receivable within said inner end of said second set of jaws to bias said second set of jaws sufficiently far apart to temporarily prevent said spring from advancing said second set of jaws toward said second aperture.

5. A cable splice as defined in claim 4, wherein:
(a) said first pin is capable of separation from said first set of jaws, thus enabling displacement of said first pin from said first set of jaws by passage of a member through said first aperture to contact said first pin, thereby relieving said biasing and permitting said spring to urge said first set of jaws along said axis toward said first aperture; and,
(b) said second pin is capable of separation from said second set of jaws, thus enabling displacement of said second pin from said second set of jaws by passage of a member through said second aperture to contact said second pin, thereby relieving said biasing and permitting said spring to urge said second set of jaws along said axis toward said second aperture.

6. A cable splice as defined in claim 5, further comprising:
(a) a second spring coupled in tension between said casing and said first pin; and,
(b) a third spring coupled in tension between said casing and said second pin.

* * * * *